United States Patent Office

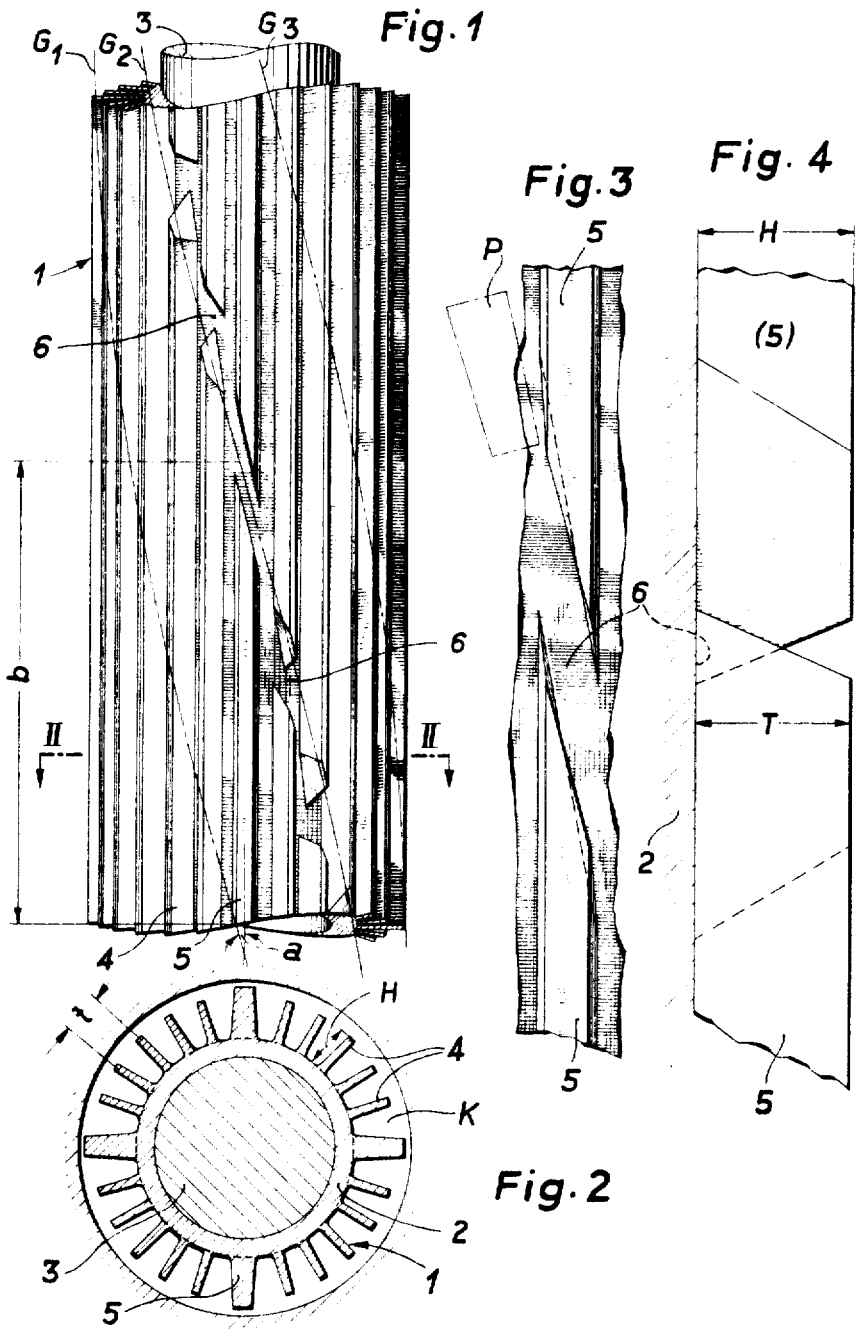

3,282,335
Patented Nov. 1, 1966

---

3,282,335
HEAT TRANSFER TUBE
Pierre de Haller, Winterthur, Switzerland, assignor to Sulzer Brothers Limited, Winterthur, Switzerland, a corporation of Switzerland
Filed Sept. 4, 1964, Ser. No. 394,496
Claims priority, application Switzerland, Sept. 6, 1963, 11,014/63
7 Claims. (Cl. 165—183)

This invention relates to a heat transfer tube with longitudinal fins along which a coolant flows in the longitudinal direction.

It is known to provide nuclear reactor fuel element cannings which may be closed at one end with longitudinal fins along which the reactor coolant flows in the longitudinal direction, so as to obtain good heat transfer to the reactor coolant with minimum resistance to flow. With such fins, however, it has been found that under certain operating conditions a laminar flow occurs along the fins and this has an adverse effect on the heat transfer to the coolant. Since there are also practically always irregularities in the heat evolution over the periphery of the fuel element, for example, due to irregular neutron flux, etc., the reactor coolant flowing along different fins has different end temperatures. This is undesirable since in these conditions some of the reactor coolant does not reach the desired end temperature while on the other hand not all portions of the fuel are sufficiently cooled.

According to the invention the aforedescribed disadvantages are avoided by providing channels in the fins at an angle to the axis of the tube or fuel element whereby the channels are placed along a helical line so that the medium flowing along the fins is guided to flow around the tube in addition to flowing longitudinally thereof.

The novel features which are considered characteristic of the invention are set forth with particularity in the appended claims. The invention itself, however, and additional objects and advantages thereof will best be understood from the following description of an embodiment thereof when read in connection with the accompanying drawing wherein:

FIG. 1 is a side view of a portion of a canning for a fuel element, according to the invention.

FIG. 2 is a cross-sectional view of the canning shown in FIG. 1, the section being made along the line II—II of FIG. 1.

FIG. 3 is a large-scale front view of a portion of a fin having a slanted channel according to the invention.

FIG. 4 is a side elevation of the fin portion shown in FIG. 3.

Referring more particularly to the drawing, FIGS. 1 and 2 show a canning 1 made, for example, of magnesium, aluminum, or other suitable material for accommodating the fuel. The canning together with the fuel is accommodated in the reactor in a duct K (FIG. 2), through which the reactor coolant flows, and protects the fuel from corrosion while at the same time preventing escape of radioactive products to the reactor coolant flowing along the outside of the canning. The canning should offer minimum resistance to the flow of heat from the fuel to the reactor coolant and to the flow of the latter. Any increased resistance in the heat transfer results in reduced permissible maximum temperatures of the reactor coolant at unchanged fuel temperature and has an adverse effect on the thermal efficiency of the reactor plant. An increased resistance to flow requires higher power for circulating the reactor coolant and also reduces the reactor plant efficiency.

The canning comprises a tube 2 filled with fuel 3 and having radial, longitudinal fins 4, 5. The latter are spaced by a pitch $t$.

As shown in FIG. 1, the fins 4, 5 of the canning 1 are interrupted by ducts or channels 6 which are arranged in multiple thread fashion. The axes of the individual screw-threads are denoted by letters $G_1$, $G_2$, $G_3$. Although these screwthreads naturally intersect all fins, FIG. 1, for the sake of clarity, shows only the ducts or channels formed by the screwthread $G_2$. In FIG. 3 the duct 6 formed by the screwthread in the fin 5 is shown to an enlarged scale. The duct is preferably sharp-edged and made by milling, for example. FIG. 3 also shows the profile of the profiled milling cutter P used to make the screwthread. In this case the profile is trapezoidal.

FIG. 4 is a side elevation of FIG. 3 showing the duct 6. This figure shows that the depth of the duct 6 (reference T in FIG. 4) is approximately equal to the height or radial extension H of the fin. The base area or bottom of the gap 6 is thus substantially formed by the outer wall of the tube 2.

The screwthread helix angle $a$ is preferably between 70° and 85°, i.e., relatively steep. The number of turns of the screwthread is such that depending upon the helix angle the distances $b$ (FIG. 1) between individual gaps in a fin are equal to 3–50 times the fin pitch $t$. The lateral walls of the channels 6 form portions of flanks of screwthreads which may be multiple screwthreads.

As in known cannings, the reactor coolant flows in the longitudinal direction onto the canning 1. The sharp edges of the channels placed along helical lines cause division of the coolant stream resulting in a restratification of the turbulent as well as particularly of the laminar currents of the flowing reactor coolant. At the same time, some of the coolant is transferred from one groove between parallel fins to another. The heat transfer to the coolant is thus improved by the formation of new starting zones while the twist imparted to the coolant equalizes the temperature between the various fins at the periphery of the canning. This effect is obtained most satisfactorily when the screwthread along which the channels 6 are placed extends at least once around the canning, i.e., if one turn of a helical line G occupies at least 360° of the periphery. Practice of the invention in this manner results in only a minor increase of the resistance to flow of the coolant.

Although the duct-interrupted fins according to the invention have been illustrated with reference to an embodiment wherein they are disposed at the outside of a tube of circular cross-section, other embodiments of the invention are possible. For example, the tube may have a cross-section other than circular, and may for example be tetragonal or hexagonal. Alternatively, the fins according to the invention may be formed on the inside of tubes extending, for example, through the interior of fuel elements.

I claim:
1. A heat transfer tube comprising:
   a plurality of fins extending substantially parallel to the longitudinal axis of the tube and extending substantially radially from the tube,
   said fins being provided with channels extending at a slant through the fins, such channels having the axes thereof placed along helical lines extending around said tube.

2. A heat transfer tube as defined in claim 1 wherein said channels are inclined with respect to the longitudinal axis of the respective fins at an angle of between 70° and 85°.

3. A heat transfer tube as defined in claim 1 wherein said channels have a trapezoidal cross-sectional configuration.

4. A heat transfer tube as defined in claim 1 wherein the depth of said channels is substantially equal to the radial extension of said fins.

5. A heat transfer tube as defined in claim 1 wherein said channels are milled channels.

6. A heat transfer tube as defined in claim 1 wherein the lateral walls of said channels form portions of flanks of screwthreads.

7. A heat transfer tube as defined in claim 1 wherein the lateral walls of said channels form portions of flanks of multiple screwthreads.

References Cited by the Examiner

UNITED STATES PATENTS 3,212,992 10/1965 Salesse et al. _____ 165—184 X

FOREIGN PATENTS 1,246,897 10/1960 France.
1,354,623 1/1964 France.
884,981 12/1961 Great Britain.

ROBERT A. O'LEARY, *Primary Examiner.*

N. R. WILSON, *Assistant Examiner.*